United States Patent
Cho et al.

(10) Patent No.: US 8,295,978 B2
(45) Date of Patent: *Oct. 23, 2012

(54) SYSTEM FOR COOPERATION OF MULTIPLE ROBOTS USING DYNAMIC BEHAVIOR BINDING AND METHOD THEREOF

(75) Inventors: Joonmyun Cho, Daejeon (KR);
Hyoungsun Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 578 days.

This patent is subject to a terminal disclaimer.

(21) Appl. No.: 12/539,724

(22) Filed: Aug. 12, 2009

(65) Prior Publication Data
US 2010/0094459 A1    Apr. 15, 2010

(30) Foreign Application Priority Data
Oct. 9, 2008 (KR) .......................... 10-2008-0099129

(51) Int. Cl.
G05B 19/418 (2006.01)
G05B 19/04 (2006.01)
G05B 19/18 (2006.01)
G06F 19/00 (2011.01)

(52) U.S. Cl. .......... 700/248; 700/95; 700/246; 700/247; 700/250; 700/253; 901/1; 901/50

(58) Field of Classification Search .............. 700/95, 700/245–255; 901/1, 50; 395/90
See application file for complete search history.

(56) References Cited

U.S. PATENT DOCUMENTS

| 5,889,926 | A | * | 3/1999 | Bourne et al. | 700/255 |
| 6,493,607 | B1 | * | 12/2002 | Bourne et al. | 700/255 |
| 6,816,753 | B2 | * | 11/2004 | Sakamoto et al. | 700/245 |
| 2002/0173879 | A1 | | 11/2002 | Sakamoto et al. | |
| 2004/0162638 | A1 | * | 8/2004 | Solomon | 700/247 |
| 2005/0197739 | A1 | * | 9/2005 | Noda et al. | 700/245 |
| 2006/0184491 | A1 | * | 8/2006 | Gupta et al. | 706/47 |
| 2007/0208442 | A1 | * | 9/2007 | Perrone | 700/95 |

(Continued)

FOREIGN PATENT DOCUMENTS

| KR | 2002-0067693 | 8/2002 |
| KR | 10-2005-0108518 | 11/2005 |
| KR | 10-2008-0089148 | 10/2008 |
| KR | 10-2009-0093652 | 9/2009 |

OTHER PUBLICATIONS

"A Framework for the Development of Cooperative Robotic Applications," Proceedings of 12th International Conference on Advanced Robotics, ICAR '05, Nebot et al., Jul. 2005, pp. 901-906.

(Continued)

*Primary Examiner* — James Trammell
*Assistant Examiner* — Majdi Alsomiri
(74) *Attorney, Agent, or Firm* — Staas & Halsey LLP (57) ABSTRACT

The present invention relates to a system for cooperation of multiple mobile robots and a method thereof that allow the multiple mobile robots to cooperatively execute one complicated task. The system and method can use centralized control architecture, create robot cooperation application codes on the basis of conceptual behavior units without depending on actual physical robots, and dynamically bind behavior units used to create the robot cooperation application at the time of executing the robot cooperation application to actual functions of the robots, thereby actively adjusting to changes in a dynamical environment, such as a change in the types, the number, and the functions of robots for cooperation.

15 Claims, 3 Drawing Sheets

U.S. PATENT DOCUMENTS

2007/0239314 A1* 10/2007 Kuvich .................. 700/245
2008/0141220 A1    6/2008 Kim et al.
2008/0243305 A1   10/2008 Lee et al.
2009/0149991 A1*  6/2009 Sumida et al. .......... 700/246
2009/0187278 A1*  7/2009 Zhuk ...................... 700/246
2009/0254217 A1* 10/2009 Pack et al. .............. 700/246

OTHER PUBLICATIONS

"Miro: Middleware for Autonomous Mobile Robots," Transactions on Robotics and Automation, IEEE, vol. 18, Issue 4, Enderle et al., Aug. 2001, 6 pages.

* cited by examiner

SYSTEM FOR COOPERATION OF MULTIPLE ROBOTS USING DYNAMIC BEHAVIOR BINDING AND METHOD THEREOF

RELATED APPLICATIONS

The present application claims priority to Korean Patent Application Serial Number 10-2008-0099129, filed on Oct. 9, 2008, the entirety of which is hereby incorporated by reference.

BACKGROUND OF THE INVENTION

1. Field of the Invention

The present invention relates to a system for cooperation of multiple mobile robots using dynamic behavior binding and a method thereof, and more particularly, to a system for cooperation of robots and a method thereof that allow multiple robots based on a network to actively adjust to changes in a dynamical environment and execute a given task through cooperation.

2. Description of the Related Art

In general, independent robots have a large-quantity storage device or an information processing function and can independently recognize information, execute various processes, and perform various behaviors. However, due to the spread of a network, robots based on the network have been developed, which are configured such that the robots based on the network have only basic sensing and networking functions without a large-capacity storage device and an information processing function, and the functions independently executed by the general robots are distributed to the network so as to allow a server at a remote place to execute the functions of the general robots. That is, the robots based on the network are distributed and interact with an external device through network communication.

Meanwhile, a robot cooperation application that allows the above-described robots based on the network to execute a given task through cooperation needs to be opened and configured in consideration of a dynamical environment. Since the individual robots are heterogeneous, the hardware and software configurations thereof may be different from each other. The robots may dynamically join or secede from a task execution organization. One robot may stop its operation due to a communication obstacle or an obstacle in the robot, while the task is executed. A task execution environment may be changed whenever the task is executed. For example, when a task of moving a box is executed, the size or weight of the box may be changed whenever the task is executed.

The cooperation of the multiple robots that consider the dynamical environment are associated with how to construct the robots as one team to execute the given task, how to divide the given task into subtasks that can be executed by the individual robots, how to allocate the divided subtasks to the individual robots, how to allow the individual robots to formulate execution plans on the subtasks allocated by the individual robots as sequential aggregates of unit behaviors, and how to avoid the physical and logical collision between the robots and ensure cooperation between the robots, when the individual robots execute the unit behaviors according to their execution plans.

A problem of when the multiple robots based on the network operate together and execute a task through cooperation is closely connected with control architecture. In the existing autonomous agent oriented distributed architecture, the dynamic problem is resolved through communication between the robots. However, this architecture is only applied to an experimental example, because communication traffic is heavy, information exchanged through the communication is complex, and it is difficult to search an appropriate algorithm that processes the information in order to finally execute a specific behavior. That is, in the autonomous agent oriented distributed architecture, most of the communication protocols and algorithms can be effectively used only on a specific assumption or in a simple situation.

Meanwhile, the traditional centralized control architecture can obtain a superior result as compared with the agent based architecture, by synthetically determining a situation in a central server and controlling the robots. That is, since an application can be executed in only the central server, the application can be created as a single code, situation information is synthetically collected and determined in a single code, and the individual robots are synthetically controlled on the basis of the situation information. Accordingly, it is possible to remove or simplify the task division step, the task allocation step, the execution plan formulation step, and the inter-robot coordination step, which are described above.

However, in the case of the existing traditional centralized control architecture, since the functions to execute the above individual steps and the robot control are coded in advance at the time of developing the architecture, it is not possible to actively adjust to changes in a dynamical environment.

SUMMARY OF THE INVENTION

Accordingly, the present invention has been made to solve the above-described problems, and it is an object of the present invention to provide a system for cooperation of multiple mobile robots and a method thereof that can use centralized control architecture, create robot cooperation application codes on the basis of conceptual behavior units without depending on actual physical robots, at the time of developing a cooperation application, and dynamically bind behavior units to individual functions of the actual robots at the time of executing the cooperation application, thereby actively adjusting to changes in a dynamical environment.

A system for cooperation of multiple mobile robots using dynamic behavior binding according to an embodiment of the present invention is a system for cooperation of robots using dynamic behavior binding. The system includes: a behavior unit storage unit that stores conceptual behavior units of robots; an application creating unit that creates a robot cooperation application using the behavior units stored in the behavior unit storage unit and creates an application specification for the robot cooperation application; and an application executing unit that analyzes the application specification to determine a robot combination for executing the robot cooperation application, and generates a behavior binding object on the basis of the robot combination.

The behavior units are software objects that are generated on the basis of conceptual and common behaviors executed by robots based on a network.

The application specification describes the minimum number of robots that are needed to execute the robot cooperation application.

The application specification defines interface types of robot functions that are bound to the behavior units.

The application specification is created in a form of an XML or a text file.

The behavior binding object is responsible for binding between the behavior units and the robot functions that are needed to execute the robot cooperation application on the basis of information defined in the application specification and information of the available robots at the time of executing the robot cooperation application and the functional configurations of the available robots.

The application executing unit includes a robot searching unit that searches the available robots at the time of executing the robot cooperation application and the functional configurations of the available robots and selects the actual available robots in a range that satisfies an essential condition of the minimum number of robots described in the application specification.

The application executing unit includes an application specification analyzing unit that analyzes the application specification and calculates the optimal configuration that enables the robot cooperation among the actual available robots.

A method for cooperation of multiple mobile robots using dynamic behavior binding according to another embodiment of the present invention is a method for cooperation of robots using dynamic behavior binding. The method includes storing conceptual behavior units of robots; storing a robot cooperation application created using the stored behavior units; storing an application specification for the robot cooperation application; and analyzing the application specification to determine a robot combination for executing the robot cooperation application, and generating a behavior binding object on the basis of the robot combination.

The behavior units are software objects that are generated on the basis of conceptual and common behaviors executed by robots based on a network.

The method further includes calling the corresponding robots using the generated behavior binding object, driving the corresponding robots, and allowing the corresponding robots to cooperatively execute a task according to the robot cooperation application.

The application specification defines interface types of specific robot functions that are bound to the behavior units.

The application specification describes the minimum number of robots that are needed to execute the robot cooperation application.

The application specification is created in a form of an XML or a text file.

The determining of the robot combination for executing the robot cooperation application includes searching the available robots at the time of executing the robot cooperation application and the functional configurations of the available robots, and selecting the actual available robots in a range that satisfies an essential condition of the minimum number of robots described in the application specification.

The determining of the robot combination for executing the robot cooperation application includes calculating the optimal configuration that enables the robot cooperation among the actual available robots on the basis of the application specification.

The behavior binding object is responsible for binding between the behavior units and the specific robot functions that are needed to execute the robot cooperation application on the basis of information defined in the application specification and information of the available robots at the time of executing the robot cooperation application and the functional configurations of the available robots.

According to the present invention, robot cooperation application codes are created in advance on the basis of virtual behavior units without depending on actual physical robots and the virtual behavior units are dynamically bound to specific functions of the specific robots at the time of executing the robot cooperation application, thereby actively adjusting to changes in a dynamical environment even though there is no system that can execute a task division step, a task allocation step, an execution plan formulation step, and an inter-robot cooperation adjustment step.

DESCRIPTION OF THE PREFERRED EMBODIMENTS

The present invention will be described in detail with reference to the accompanying drawings. Here, the repetitive description or the known functions or configurations that may make the spirit of the present invention unclear are not described. Rather, these embodiments are provided so that this disclosure will be thorough and complete and will fully convey the concept of the invention to those skilled in the art. Accordingly, the shapes and sizes of components in the drawings may be exaggerated.

Hereinafter, the preferred embodiment of the present invention will be described with reference to the accompanying drawings.

Figure 1:
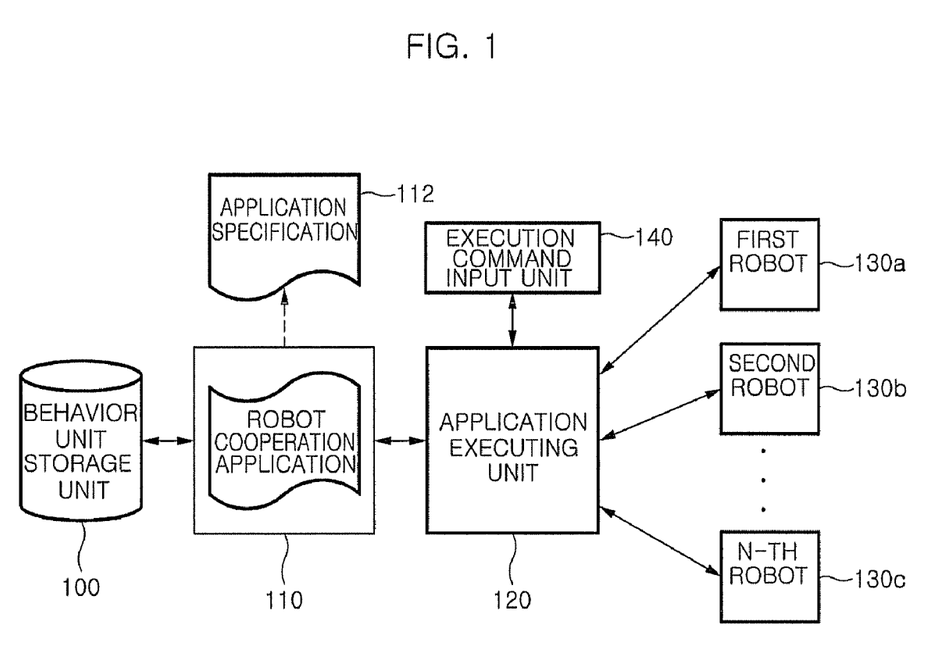
FIG. 1 is a diagram illustrating a system for cooperation of multiple mobile robots using dynamic behavior binding according to an embodiment of the present invention.
Figure 2:
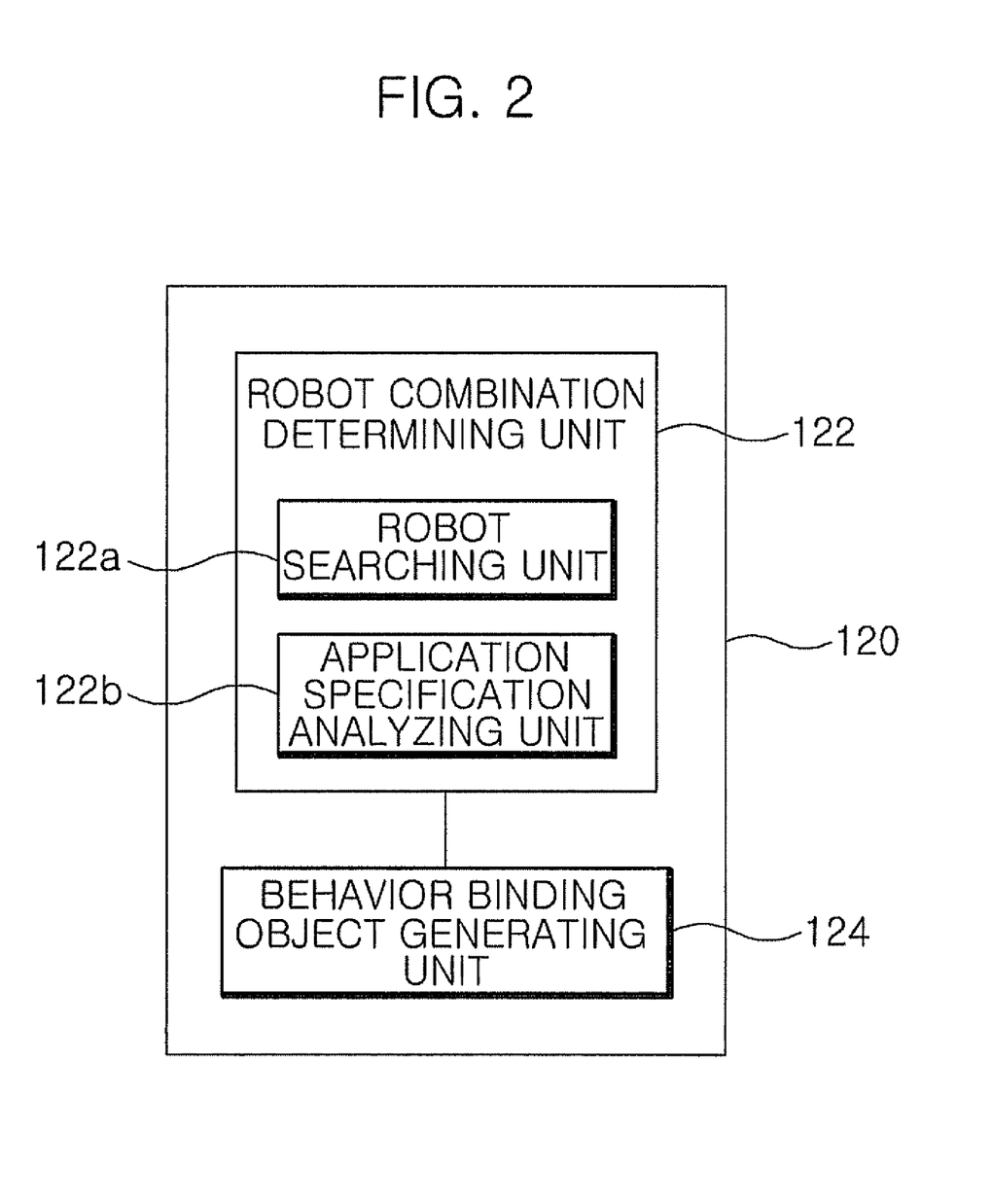
FIG. 2 is a diagram illustrating the detailed configuration of an application executing unit in a system for cooperation of multiple mobile robots using dynamic behavior binding shown in FIG. 1.

FIG. 1 is a diagram illustrating a system for cooperation of multiple mobile robots using dynamic behavior binding according to an embodiment of the present invention, and FIG. 2 is a diagram illustrating the detailed configuration of an application executing unit 120 in a system for cooperation of multiple mobile robots using dynamic behavior binding shown in FIG. 1.

The system for cooperation of multiple mobile robots using dynamic behavior binding according to the embodiment of the present invention includes a behavior unit storage unit 100, an application creating unit 110, an application executing unit 120, multiple robots 130*a* to 130*c*, and an execution command input unit 140.

First, the behavior unit storage unit 100 defines a conceptual behavior unit of a mobile robot based on a network and stores the defined behavior unit. In this case, the mobile robot based on the network has only basic sensing and networking functions without a large-quantity storage device or an information processing function. The mobile robot based on the network distributes functions that are independently executed by an existing robot to the network, such that the functions executed by the existing robot can be executed by a server at a remote place. That is, the mobile robots based on the network are distributed and interact with an external device through network communication.

The 'behavior unit' that is stored in the behavior unit storage unit 100 is based on a previously defined behavior object of the robot. That is, the behavior unit storage unit 100 defines a conceptual and common behavior that is executed by the mobile robot based on the network, transforms the conceptual and common behavior into a software (S/W) object, and stores the software object. For example, behavior objects of a cleaning robot may be mainly divided into behavior objects of movement, rotation, suction, sweep, and object detection. Specifically, the behavior objects of the 'movement' may be divided into behavior objects of 'forward movement' and 'backward movement', and the behavior objects of the 'sweep' may be divided into behavior objects of 'inward sweep' and 'outward sweep'. In this invention, the behavior unit storage unit 100 stores various behavior units based on the previously defined behavior objects. Meanwhile, the behavior units of the mobile robots that are stored in the behavior unit storage unit 100 may be commonly or partially applied to the multiple robots 130a to 130c shown in FIG. 1.

The application creating unit 110 allows a developer to create robot cooperation application software (hereinafter, referred to as 'robot cooperation application'), which enables the robots 130a to 130c based on the network to cooperate with each other using the behavior units previously stored in the behavior unit storage unit 100, thereby executing a task. The robot cooperation application development is made similar to the common software development. For example, the developer allows the application creating unit 110 to use the behavior units stored in the behavior unit storage unit 100 to create an application to execute a task where the multiple mobile robots move a wide board by a predetermined distance, create an application to execute a task where the multiple mobile robots do cleaning in a predetermined space, or create an application to execute a task where the multiple mobile robots assemble parts of a vehicle in order. At this time, even in a state where functions of the actual mobile robots that execute the behavior units are not yet determined, each behavior is recognized as one unit object. Therefore, compiling and debugging processes can be executed. That is, since robot cooperation application codes can be previously created on the basis of virtual behavior units independently from the actual physical robots, the compiling and debugging processes can be executed. Accordingly, the present invention can provide a system and a method for cooperation of multiple mobile robots that can actively adjust to changes in a dynamical environment without implementing a system that is actually responsible for a task division step, a task allocation step, an execution plan formulation step, and an inter-robot coordination adjustment step that remain as technically difficult problems in the existing agent based architecture.

If the application for cooperation of the multiple mobile robots is completely created, the developer can use the application creating unit 110 to create an 'application specification 112' for the robot cooperation application. In this case, the application specification 112 can be created in a form of an XML or a text file. The 'application specification' 112 describes the minimum number of conceptually needed robots (in this case, the robots are not actual physical robots but the conceptual robots), a mapping relationship between behavior units where the robots are to be allocated and the robots, and a mapping relationship between the behavior units and the interface types of the actual robot functions responsible for the behavior units. That is, the application specification 112 may describe the number of essentially required conceptual robots and a mapping relationship between the behavior units and conceptual robots that can execute the individual behavior units, and the interface types of the robot functions that can be bound to the individual behavior units.

For example, it is assumed that the robot cooperation application created by the application creating unit 110 is an application to execute a task where the robots lift one wide board and move one wide board by a predetermined distance, and this application is created using the behavior units previously stored in the behavior unit storage unit 100. The robot cooperation application may need two conceptual behavior units. The first conceptual behavior unit is a behavior unit for the operation of lifting a disposed board, and the second conceptual behavior unit is a behavior unit for the operation of moving the board. The application specification 112 for the robot cooperation application may describe the following items. First, the application specification 112 may describe an item where two physical robots are minimally needed to lift the board at both sides thereof, because of the center of gravity, in order to stably execute a task (however, at the time of executing the robot cooperation application, if a large amount of available robots exist, the number of robots is not limited to two. If two or more robots can be used, task execution efficiency is generally improved. That is, the robots that are described in the application specification are conceptual robots and minimally required robots). In addition, since the above-described two conceptual robots need to have the behavior unit for the operation of lifting the board, this condition is described in the application specification 112. Further, the behavior unit for the operation of lifting the board is mapped to a robot function that can specifically execute the behavior unit, and this content is described in the application specification 112. More specifically, any robot may use its legs to lift an object. Accordingly, the application specification 112 describes a mapping relationship between the individual behavior units needed to execute a task and the interface types (for example, an arm control interface type or a leg control interface type) of the actual robot functions that are responsible for the individual behavior units.

Meanwhile, a mapping relationship between the behavior units and the functions of the robots at the time of executing a robot cooperation application may be changed depending on the robots available at the point of time of executing the robot cooperation application and the functional configurations of the robots. For example, in the case of the robot that can perform the operation of lifting a board and the operation of moving the board, as described above, the corresponding tasks may be executed by one robot or the operation of lifting the board and the operation of moving the board may be executed by the two robots, respectively.

The application executing unit 120 analyzes the application specification 112 in accordance with an execution command from the execution command input unit 140 and dynamically generates a 'behavior binding object'. In this case, the 'behavior binding object' means an object that is responsible for binding between the behavior units and the robot functions that are needed to execute a predetermined task, on the basis of information (for example, information related to mapping) defined in the application specification 112 and information of the robots available at the time of executing a robot cooperation application and the functional configurations of the robots. For this purpose, the application executing unit 120 searches the current available robots and the functional configurations of the current available robots, calculates the optimal configuration where robot cooperation can be executed on the basis of the mapping relationship described in the application specification 112, and finally determines an optimal combination for cooperation of the robots.

In order to perform the above operation, the application executing unit 120 includes a robot combination determining unit 122 that determines an optimal combination for cooperation of the robots and a behavior binding object generating unit 124 that dynamically generates the 'behavior binding object' (refer to FIG. 2). Specifically, the robot combination determining unit 122 includes a robot searching unit 122a that searches the current available robots and the functional configurations of the current available robots and searches the actually available robots on the basis of minimal sufficient conditions of the robots, and an application specification analyzing unit 122b that calculates the optical configuration where robot cooperation can be executed, on the basis of the mapping relation described in the application specification 112. In this case, the actually available robots that are searched by the robot searching unit 122a mean robots that enable task execution according to the robot cooperation application created by the application creating unit 110 among the available robots.

The multiple robots 130a to 130c are network based robots that can receive behavior commands that are transmitted from the application executing unit 120 through the network and execute corresponding functions on the basis of the received behavior commands. The types of robots that are applied to the present invention may be various. For example, service robots may be divided into home robots, entertainment robots, life-supporting robots, and the other robots, according to utilization purposes. The home robots may include a household robot, an education robot, a cleaning robot, a guard robot, a delivery robot, and a weeding robot, and the entertainment robots may include a cherished robot, a game robot, and a sport robot. The life-supporting robots may include a medical treatment robot, a robot for the disabled, an auxiliary robot, a rehabilitation robot, and a nursing robot, and the other robots may include a military robot, an aerial/universal robot, a medical treatment robot, and a social safety robot. The robots that can be applied to the present invention can provide robot service functions to an external server through the network and provide various services to people through robot cooperation by simplifying the robot hardware configuration. Since the network based robots can simplify the robot functions, the manufacturing costs and sizes thereof can decrease, contents can be easily added and changed, and a merging technology can be easily received through the network.

Figure 3:
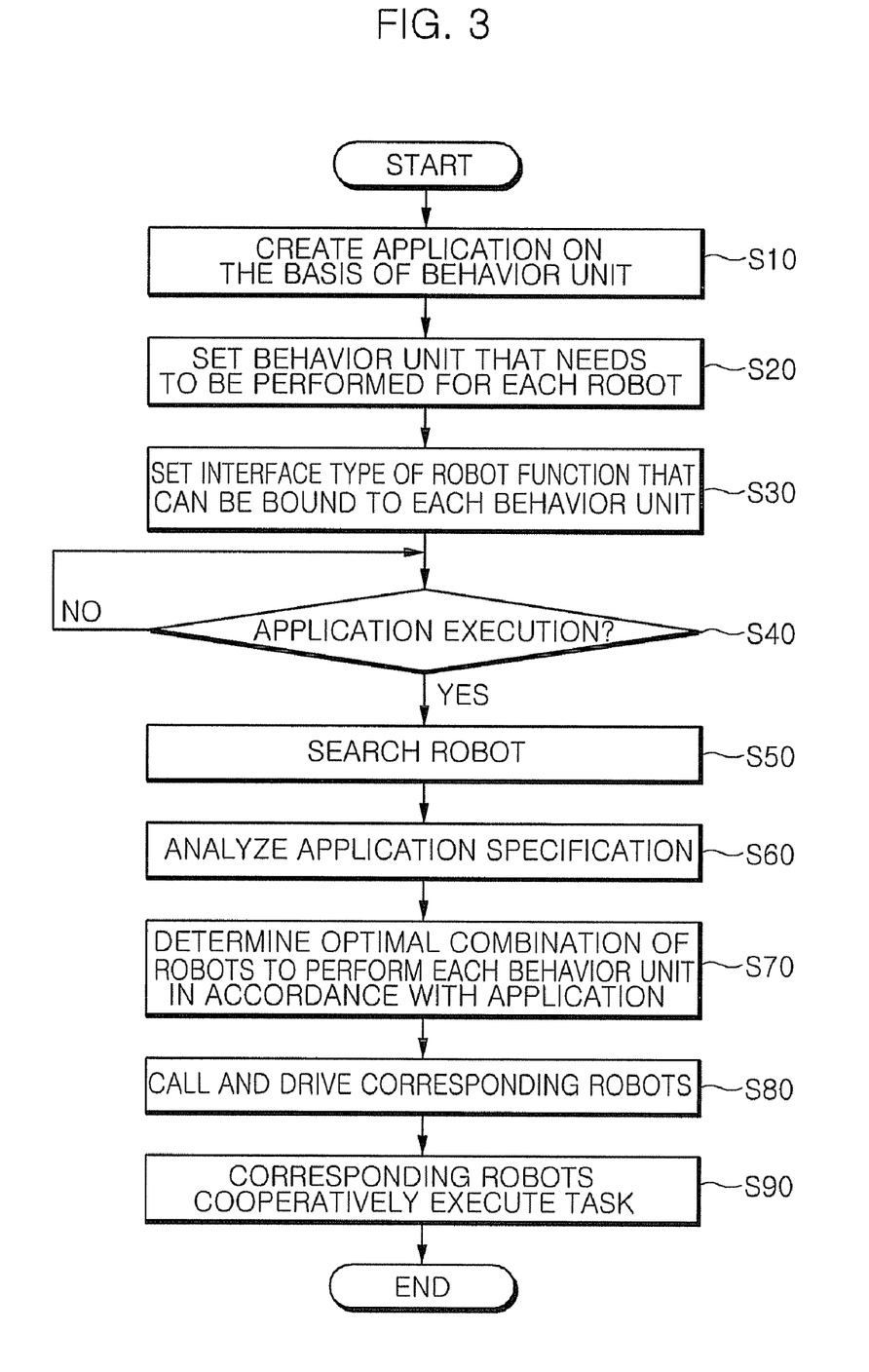
FIG. 3 is a method for cooperation of multiple mobile robots using dynamic behavior binding according to an embodiment of the present invention.

FIG. 3 is a diagram illustrating a method for cooperation of multiple mobile robots using dynamic behavior binding according to an embodiment of the present invention.

First, the developer allows the application creating unit 110 to create an application for robot cooperation (hereinafter, referred to as robot cooperation application) using the previously defined behavior units stored in the behavior unit storage unit 100 (S10). At this time, the 'behavior units' that are stored in the behavior unit storage unit 100 are based on the previously defined behavior objects of the robots. That is, the behavior unit storage unit 100 defines a conceptual and common behavior that is executed by the robots based on the network, transforms the conceptual and common behavior into an S/W object, and stores the S/W object. For example, the developer can use the application creating unit 110 to create an application to execute a task where the multiple robots cooperate with each other, and lift a wide board and move the wide board by a predetermined distance. At this time, in order to create the application, a behavior unit for the operation of lifting the board and a behavior unit for the operation of moving the board to the desired location are essentially required. As described above, the developer can use the previously defined behavior units stored in the behavior unit storage unit 100 according to the types of desired tasks through robot cooperation to create a robot cooperation application by the application creating unit 110.

Next, if the application creating unit 110 completely creates the robot cooperation application, the application creating unit 110 stores the created robot cooperation application and allows the developer to create the 'application specification 112 for the robot cooperation application. In this case, the application specification 112 can be created in a form of an XML or a text file. The developer uses the application creating unit 110 to describe the number of robots conceptually needed to execute the application, a mapping relationship between the behavior units allocated to the corresponding robots and the robots, and a mapping relationship between the behavior units and the interface types of the actual robot functions responsible for the behavior units in the application specification 112 (S20 and S30). That is, the developer uses the application creating unit 110 to describe the minimum number of conceptually needed robots and a mapping relationship between the individual behavior units and the robots, and the interface types of the robot functions that can be bound to the individual behavior units in the application specification 112. As described above, the present invention provides a method for cooperation of multiple mobile robots that can previously create robot cooperation application codes on the basis of the conceptual behavior units, independently from the actual physical robots, and bind the virtual behavior units to the specific functions of the corresponding robots at the time of executing the robot cooperation application, thereby actively adjusting to changes in a dynamical environment. If the application specification for the robot cooperation application is created by the application creating unit 110, the application creating unit 110 stores the created application specification.

Next, if the robot cooperation application and the application specification are created through Steps S10 to S30, the application executing unit 120 determines whether an execution command is input from the execution command input unit 140 (S40). If the execution command is input from the execution command input unit 140 in Step S40, the application executing unit 120 executes the following processes.

First, the application executing unit 120 searches the current available robots and the functional configurations of the current available robots (S50). At this time, the available robots mean robots that are distributed and interact with a robot control server through network communication, that is, the system for cooperation of multiple mobile robots according to the embodiment of the present invention. Next, the application executing unit 120 analyzes the application specification 112 (S60). Next, the application executing unit 120 calculates the optimal configuration where robot cooperation can be executed on the basis of the mapping relationship described in the application specification 112, and finally determines an optimal combination for cooperation of the robots (S70). In addition, the application executing unit 120 dynamically generates the 'behavior binding object' on the basis of the robot combination determined in Step S70. In this case, the 'behavior binding object' means an object that is responsible for binding between the behavior units and the robot functions that are needed to execute a predetermined task, on the basis of the information (for example, information related to mapping) defined in the application specification 112 and the information of the robots available at the time of executing the robot cooperation application and the functional configurations of the robots, as described above with reference to FIG. 1. A mapping relationship between the behavior units and the functions of the robots at the time of executing the robot cooperation application may be changed depending on the robots available at the point of time of executing the robot cooperation application and the functional configurations of the available robots. For example, in the case of the robot that can perform the operation of lifting a board and the operation of moving the board, as described above, the corresponding tasks may be executed by one robot or the operation of lifting the board and the operation of moving the board may be executed by the two robots, respectively.

Meanwhile, if the optimal combination for robot cooperation is finally determined and the 'behavior binding object' is dynamically generated on the basis of the determined robot combination, the application executing unit 120 calls the corresponding robots on the basis of the generated behavior binding object and drives the robots, and allows the corresponding robots to cooperatively execute a task according to an application (S80 and S90).

As described above, the multiple robots can cooperatively execute the given task by actively adjusting to changes in a dynamical environment without implementing a system that is responsible for a task division step, a task allocation step, an execution plan formulation step, and an inter-robot coordination adjustment step. That is, since the virtual behavior units are bound to the specific functions of the corresponding robots at the time of executing the robot cooperation application, the robot cooperation application codes can be previously created on the basis of the virtual behavior units without depending on the actual physical robots, and the compiling and debugging processes can be executed even in a state where the functions of the actual robots that execute the behavior units are not determined. Accordingly, it is possible to decrease design costs and time needed to implement the actual system.

Meanwhile, the present invention can be implemented as codes, which can be read by a computer and stored in a recording medium readable by the computer. Examples of the recording medium that can be read by the computer include all kinds of recording devices where data readable by a computer system is stored. Specifically, examples of the recording medium that can be read by the computer may include a ROM, a RAM, a CD-ROM, a magnetic tape, a floppy disk, and an optical data storage device. The recording medium may be implemented in a form of a carrier wave (for example, transmission through the Internet). In the recording medium that can be read by the computer, codes can be stored and executed, which are distributed to a system connected through a network and can be read by the computer in a distribution method.

The optimal embodiments have been disclosed in the drawings and the specification. The specific terminologies used herein are for the purpose of describing the present invention only and are not intended to be limited to the present invention described in the appended claims. Accordingly, it will be apparent to those skilled in the art that various modifications and changes may be made without departing from the scope and spirit of the invention. The scope of the present invention should be defined by the technical spirit of the appended claims rather than by the above description.

What is claimed is:

1. A system for cooperation of robots using dynamic behavior binding, comprising:

a behavior unit storage unit that stores conceptual behavior units of robots;

an application creating unit that creates a robot cooperation application using the behavior units stored in the behavior unit storage unit and creates an application specification for the robot cooperation application, wherein the application specification defines a mapping relationship between the behavior units and the robots that execute the behavior units; and an application executing unit that analyzes the application specification to determine a robot combination for executing the robot cooperation application based on the mapping relationship defined in the application specification, and generates a behavior binding object on the basis of the robot combination, wherein the behavior binding object is responsible for binding between the behavior units and the robot functions that are needed to execute the robot cooperation application on the basis of information defined in the application specification and information of the available robots at the time of executing the robot cooperation application and the functional configurations of the available robots.

2. The system of claim 1, wherein the behavior units are software objects that are generated on the basis of conceptual and common behaviors executed by the robots based on a network.

3. The system of claim 1, wherein the application specification describes the minimum number of robots that are needed to execute the robot cooperation application.

4. The system of claim 1, wherein the application specification defines interface types of robot functions that are bound to the behavior units.

5. The system of claim 1, wherein the application specification is created in a form of an XML or a text file.

6. The system of claim 1, wherein the application executing unit includes:

a robot searching unit that searches the available robots at the time of executing the robot cooperation application and the functional configurations of the available robots and selects the actual available robots in a range that satisfies an essential condition of the minimum number of robots described in the application specification.

7. The system of claim 1, wherein the application executing unit includes:

an application specification analyzing unit that analyzes the application specification and calculates the optimal configuration that enables the robot cooperation among the actual available robots.

8. A computer system for performing a method for cooperation of robots using dynamic behavior binding, the method comprising:

storing conceptual behavior units of robots;

storing a robot cooperation application created using the stored behavior units;

storing an application specification for the robot cooperation application, wherein the application specification defines a mapping relationship between the behavior units and the robots that execute the behavior units; and analyzing the application specification to determine a robot combination for executing the robot cooperation application based on the mapping relationship defined in the application specification, and generating a behavior binding object on the basis of the robot combination, wherein the behavior binding object is responsible for binding between the behavior units and the specific robot functions that are needed to execute the robot cooperation application on the basis of information defined in the application specification and information of the available robots at the time of executing the robot cooperation application and the functional configurations of the available robots.

9. The method of claim 8, wherein the behavior units are software objects that are generated on the basis of conceptual and common behaviors executed by the robots based on a network.

10. The method of claim 8, further comprising:
calling the corresponding robots using the generated behavior binding object, driving the corresponding robots, and allowing the corresponding robots to cooperatively execute a task according to the robot cooperation application.

11. The method of claim 8,
wherein the application specification describes the minimum number of robots that are needed to execute the robot cooperation application.

12. The method of claim 8,
wherein the application specification defines interface types of robot functions that are bound to the behavior units.

13. The method of claim 8,
wherein the application specification is created in a form of an XML or a text file.

14. The method of claim 8,
wherein the determining of the robot combination for executing the robot cooperation application includes:
searching the available robots at the time of executing the robot cooperation application and the functional configurations of the available robots and selecting the actual available robots in a range that satisfies an essential condition of the minimum number of robots described in the application specification.

15. The method of claim 8,
wherein the determining of the robot combination for executing the robot cooperation application includes:
calculating the optimal configuration that enables the robot cooperation among the actual available robots on the basis of the application specification.

* * * * *